United States Patent
Krishnamurthy et al.

(10) Patent No.: US 11,061,571 B1
(45) Date of Patent: Jul. 13, 2021

(54) TECHNIQUES FOR EFFICIENTLY ORGANIZING AND ACCESSING COMPRESSIBLE DATA

(71) Applicant: NVIDIA CORPORATION, Santa Clara, CA (US)

(72) Inventors: Praveen Krishnamurthy, Apex, NC (US); Wishwesh Anil Gandhi, Sunnyvale, CA (US)

(73) Assignee: NVIDIA Corporation, Santa Clara, CA (US)

( * ) Notice: Subject to any disclaimer, the term of this patent is extended or adjusted under 35 U.S.C. 154(b) by 5 days.

(21) Appl. No.: 16/824,527

(22) Filed: Mar. 19, 2020

(51) Int. Cl.
*G06F 3/06* (2006.01)

(52) U.S. Cl.
CPC .......... *G06F 3/0608* (2013.01); *G06F 3/0659* (2013.01); *G06F 3/0673* (2013.01)

(58) Field of Classification Search
CPC . G06F 3/0608; G06F 3/0673; G06F 2212/401
See application file for complete search history.

(56) References Cited

U.S. PATENT DOCUMENTS

| | | | |
|---|---|---|---|
| 8,233,004 B1 * | 7/2012 | Molnar | G06T 9/00 345/581 |
| 9,934,145 B2 | 4/2018 | Krishnamurthy et al. | |
| 10,402,323 B2 | 9/2019 | Krishnamurthy et al. | |
| 2012/0317334 A1 * | 12/2012 | Suzuki | G06F 3/0688 711/103 |
| 2017/0133097 A1 * | 5/2017 | Beitler | G11C 29/021 |
| 2017/0228252 A1 * | 8/2017 | Gadelrab | G06F 15/7807 |

* cited by examiner

Primary Examiner — Edward J Dudek, Jr.
(74) Attorney, Agent, or Firm — Artegis Law Group, LLP

(57) ABSTRACT

In various embodiments, a memory interface unit organizes data within a memory tile to facilitate efficient memory accesses. In an embodiment, a memory tile represents a portion of memory that holds multiple chunks of data, where each chunk is stored either in a non-compressed or in a smaller compressed data format. In an embodiment, the tile is organized to pack multiple compressed chunks together so that multiple compressed chunks can be retrieved from memory with a single read access. In another embodiment, the tile is organized to store redundant copies of compressed chunks so that a compressed chunk can be quickly decompressed within a tile without having to relocate other compressed chunks in the tile. Additional embodiments are further disclosed for allowing efficient accesses to both compressed and non-compressed data.

20 Claims, 5 Drawing Sheets

TECHNIQUES FOR EFFICIENTLY ORGANIZING AND ACCESSING COMPRESSIBLE DATA

BACKGROUND

Field of the Various Embodiments

The various embodiments relate generally to computer processing and, more specifically, to techniques for efficiently organizing and accessing compressible data.

Description of the Related Art

Some processing systems implement one or more data compression techniques to increase the effective memory bandwidth to attached memory devices, thereby improving overall performance. In such implementations, the processing system is configured to store certain memory tiles of data within the attached memory in one or more compressed formats that reduce the number of bytes used to represent each memory tile of original data. Consequently, at any given time, the attached memory may include any number of non-compressed memory tiles of data and any number of compressed memory tiles of data.

In many processing systems configured to store compressed data, each memory tile stores multiple chunks of data, where the number of bytes in a non-compressed chunk of data is equal to the number of bytes that the processing system transmits to or from the attached memory as part of performing a write or read operation, respectively. The processing system compresses non-compressed chunks of data from multiple write requests to generate "compression atoms" that each include a compressed representation of a different non-compressed chunk of data. For instance, in some processing systems, the processing system compresses the non-compressed chunks of data from two write requests to generate two compression atoms. For each memory tile, the processing system typically allocates the number of bytes required to store the constituent non-compressed chunks of data within the attached memory. If the processing system ends up writing compression atoms to the memory tile, then the processing system simply stores the compression atoms in a contiguous portion of the memory allocated for one of the non-compressed chunks of data so that one read from the attached memory can return the compressed data for multiple chunks.

One drawback of writing compressed data to a memory tile as described above is that subsequently writing non-compressed data to the resulting compressed memory tile requires a read-modify-write operation that decreases the effective bandwidth to the attached memory. The read-modify-write operation is required to avoid overwriting the compression atom(s) that are not replaced with non-compressed data. For example, to write a new non-compressed chunk of data to a compressed memory tile, the processing system could read two compression atoms from the compressed memory tile and then decompress the two compression atoms to generate the two original non-compressed chunks of data. Subsequently, the processing system could merge the new non-compressed chunk of data with the original non-compressed chunks of data and write the two resulting chunks of data to the memory tile in either a non-compressed or a compressed format.

By contrast, writing a non-compressed chunk of data to a non-compressed memory tile requires only a single write operation. Consequently, for applications in which non-compressed data is often written to compressed memory tiles, performing the required read-modify-write operations can reduce or even eliminate any improvement in effective memory bandwidth and therefore any performance gains associated with transmitting compressed data.

As the foregoing illustrates, what is needed in the art are more effective techniques for storing compressed data in a memory.

SUMMARY

One embodiment of the present invention sets forth a computer-implemented method for storing data. The method includes compressing first non-compressed data associated with a first range of memory addresses to generate first compressed data; compressing second non-compressed data associated with a second range of memory addresses to generate second compressed data; storing the first compressed data and the second compressed data in a first portion of a memory tile that is associated with the first range of memory addresses; and storing at least one of the second compressed data or at least a portion of the second non-compressed data in a second portion of the memory tile that is associated with the second range of memory addresses.

At least one technical advantage of the disclosed techniques relative to the prior art is that, with the disclosed techniques, the number of read-modify-write operations associated with writing non-compressed data to memory tiles that already store compressed data can be reduced. In that regard, unlike prior-art techniques, the processing system can often write non-compressed data to one portion of a memory tile that includes compressed data without overwriting the data associated with the remainder of the memory tile. In particular, the processing system can store a non-compressed chunk of data in a memory tile that includes compressed data via a single write operation—without first executing a read operation. Accordingly, relative to prior art techniques, the improvement in effective memory bandwidth and performance gains associated with transmitting compressed data are more fully realized. These technical advantages provide one or more technological advancements over prior art approaches.

BRIEF DESCRIPTION OF THE DRAWINGS

So that the manner in which the above recited features of the various embodiments can be understood in detail, a more particular description of the inventive concepts, briefly summarized above, may be had by reference to various embodiments, some of which are illustrated in the appended drawings. It is to be noted, however, that the appended drawings illustrate only typical embodiments of the inventive concepts and are therefore not to be considered limiting of scope in any way, and that there are other equally effective embodiments.

DETAILED DESCRIPTION

In the following description, numerous specific details are set forth to provide a more thorough understanding of the various embodiments. However, it will be apparent to one skilled in the art that the inventive concepts may be practiced without one or more of these specific details.

System Overview

Figure 1:
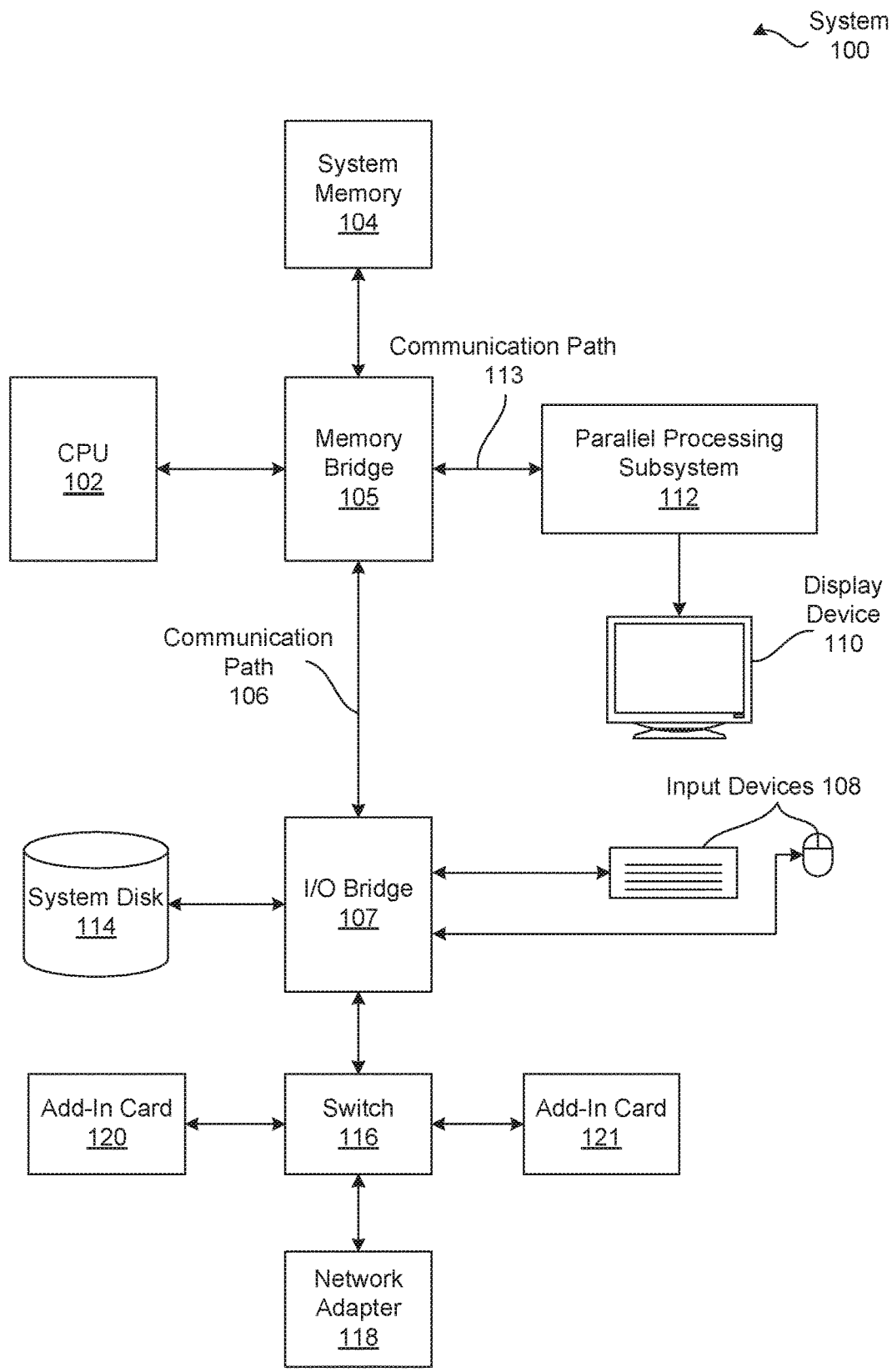
FIG. 1 is a conceptual illustration of a system configured to implement one or more aspects of the various embodiments.

FIG. 1 is a conceptual illustration of a system 100 configured to implement one or more aspects of the various embodiment. In one or more embodiments, the system 100 is a server machine operating in a data center or a cloud computing environment that provides scalable computing resources as a service over a network. In one or more embodiments, the system 100 includes, without limitation, a central processing unit ("CPU") 102 and a system memory 104 coupled to a parallel processing subsystem 112 via a memory bridge 105 and a communication path 113. The memory bridge 105 is further coupled to an input/output ("I/O") bridge 107 via a communication path 106, and the I/O bridge 107 is, in turn, coupled to a switch 116.

In one or more embodiments, the I/O bridge 107 is configured to receive user input information from input devices 108, such as a keyboard or a mouse, and forward the input information to the CPU 102 for processing via the communication path 106 and the memory bridge 105. In one or more embodiments, the system 100 may be a server machine in a cloud computing environment. In such embodiments, the system 100 may not have the input devices 108. Instead, the system 100 may receive equivalent input information by receiving commands in the form of messages transmitted over a network and received via a network adapter 118. In one or more embodiments, the switch 116 is configured to provide connections between the I/O bridge 107 and other components of the system 100, such as a network adapter 118 and any number of add-in cards 120 and 121.

In one or more embodiments, the I/O bridge 107 is coupled to a system disk 114 that may be configured to store content and applications and data for use by the CPU 102 and the parallel processing subsystem 112. In one or more embodiments, the system disk 114 provides non-volatile storage for applications and data and may include fixed or removable hard disk drives, flash memory devices, and compact disc read-only-memory, digital versatile disc-ROM, Blu-ray, high definition Digital Versatile Disc, or other magnetic, optical, or solid state storage devices. In one or more embodiments, other components, such as a universal serial bus or other port connections, compact disc drives, digital versatile disc drives, film recording devices, and the like, may be connected to the I/O bridge 107 as well.

In one or more embodiments, the memory bridge 105 may be a Northbridge chip, and the I/O bridge 107 may be a Southbridge chip. In addition, the communication paths 106 and 113, as well as other communication paths within the system 100, may be implemented using any technically suitable protocols, including, without limitation, Accelerated Graphics Port, HyperTransport, or any other bus or point-to-point communication protocol known in the art.

In one or more embodiments, the parallel processing subsystem 112 comprises a graphics subsystem that delivers pixels to a display device 110 that may be any conventional cathode ray tube, liquid crystal display, light-emitting diode display, or the like. In such embodiments, the parallel processing subsystem 112 incorporates circuitry optimized for graphics and video processing, including, for example, video output circuitry. As described in greater detail below in conjunction with FIG. 2, such circuitry may be incorporated across one or more parallel processing units ("PPUs)", also referred to herein as parallel processors, included within the parallel processing subsystem 112. In other embodiments, the parallel processing subsystem 112 incorporates circuitry optimized for general purpose and/or compute processing. Again, such circuitry may be incorporated across one or more PPUs included within the parallel processing subsystem 112 that are configured to perform such general purpose and/or compute operations. In yet other embodiments, the one or more PPUs included within the parallel processing subsystem 112 may be configured to perform graphics processing, general purpose processing, and compute processing operations. The system memory 104 includes at least one device driver (not shown) configured to manage the processing operations of the one or more PPUs within the parallel processing subsystem 112.

In one or more embodiments, the parallel processing subsystem 112 may be integrated with one or more of the other elements of FIG. 1 to form a single system. For example, the parallel processing subsystem 112 may be integrated with the CPU 102 and other connection circuitry on a single chip to form a system on chip ("SoC").

In one or more embodiments, the CPU 102 is the master processor of the system 100, controlling and coordinating operations of other system components. In one or more embodiments, the CPU 102 issues commands that control the operation of the PPUs. In one or more embodiments, the communication path 113 is a Peripheral Component Interconnect Express link, in which dedicated lanes are allocated to each PPU, as is known in the art. Other communication paths may also be used. Each PPU advantageously implements a highly parallel processing architecture. Each PPU may be provided with any amount of local parallel processing memory ("PP memory").

It will be appreciated that the system 100 shown herein is illustrative and that variations and modifications are possible. The connection topology, including the number and arrangement of bridges, the number of CPUs 102, and the number of parallel processing subsystems 112, may be modified as desired. For example, in one or more embodiments, the system memory 104 could be connected to the CPU 102 directly rather than through the memory bridge 105, and other devices would communicate with the system memory 104 via the memory bridge 105 and the CPU 102. In other embodiments, the parallel processing subsystem 112 may be connected to the I/O bridge 107 or directly to the CPU 102, rather than to the memory bridge 105. In still other embodiments, the I/O bridge 107 and the memory bridge 105 may be integrated into a single chip instead of existing as one or more discrete devices. Lastly, in certain embodiments, one or more components shown in FIG. 1 may not be present. For example, the switch 116 could be eliminated, and the network adapter 118 and the add-in cards 120, 121 would connect directly to the I/O bridge 107.

Figure 2:
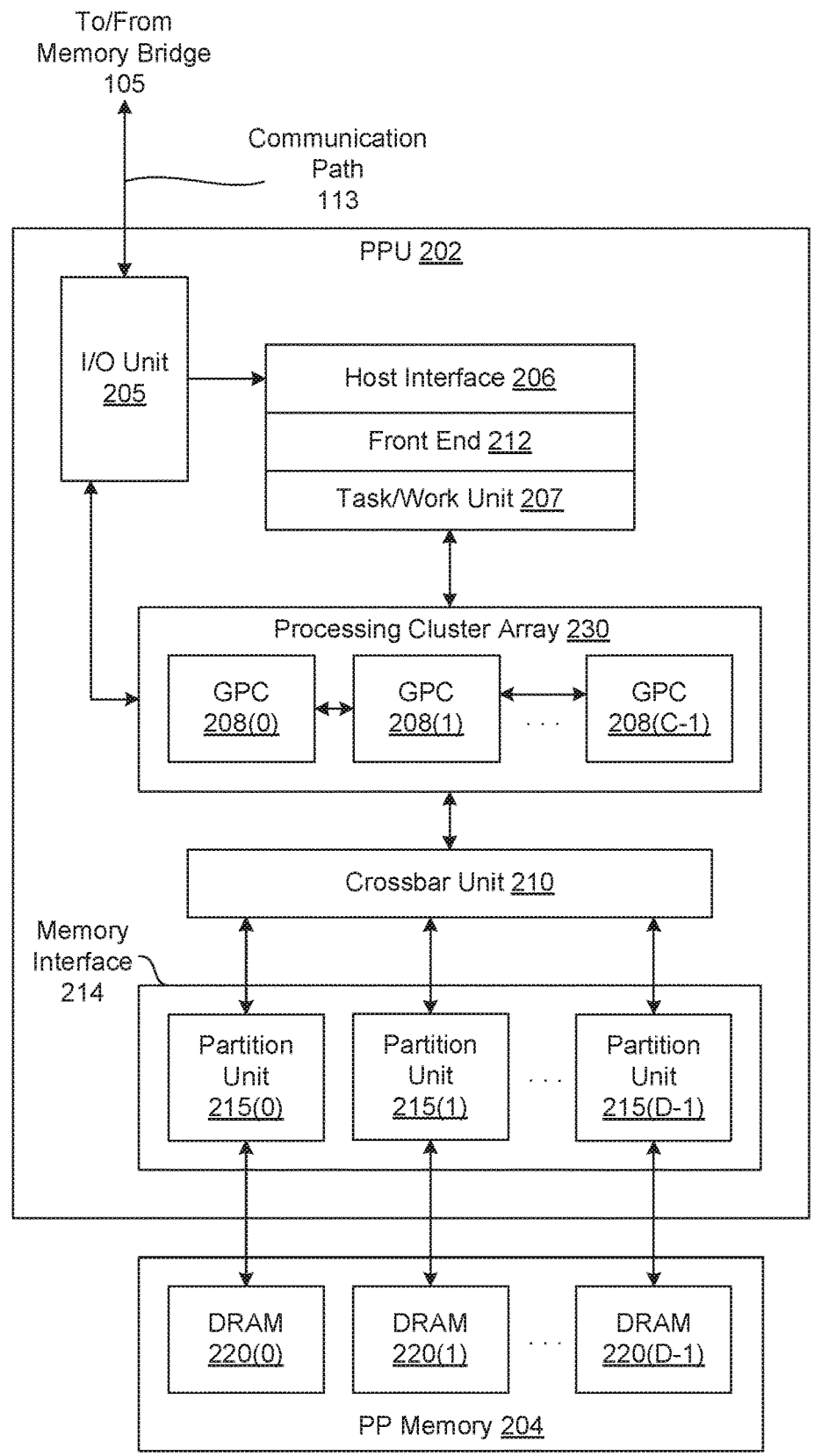
FIG. 2 is a more detailed illustration of a parallel processing unit included in the parallel processing subsystem of FIG. 1, according to various embodiments.

FIG. 2 is a more detailed illustration of a PPU 202 included in the parallel processing subsystem 112 of FIG. 1, according to various embodiments. Although FIG. 2 depicts one PPU 202, as indicated above, the parallel processing subsystem 112 may include any number of PPUs 202. As shown, the PPU 202 is coupled to a PP memory 204. The PPU 202 and the PP memory 204 may be implemented using one or more integrated circuit devices, such as programmable processors, application specific integrated circuits, or memory devices, or in any other technically feasible fashion.

In one or more embodiments, the PPU 202 comprises a graphics processing unit that may be configured to implement a graphics rendering pipeline to perform various operations related to generating pixel data based on graphics data supplied by CPU 102 and/or the system memory 104. When processing graphics data, the PP memory 204 can be used as graphics memory that stores one or more conventional frame buffers and, if needed, one or more other render targets as well. Among other things, the PP memory 204 may be used to store and update pixel data and deliver final pixel data or display frames to the display device 110 for display. In one or more embodiments, the PPU 202 also may be configured for general-purpose processing and compute operations. In one or more embodiments, the system 100 may be a server machine in a cloud computing environment. In such embodiments, the system 100 may not have the display device 110. Instead, the system 100 may generate equivalent output information by transmitting commands in the form of messages over a network via the network adapter 118.

In one or more embodiments, the CPU 102 is the master processor of system 100, controlling and coordinating operations of other system components. In one or more embodiments, the CPU 102 issues commands that control the operation of the PPU 202. In one or more embodiments, the CPU 102 writes a stream of commands for the PPU 202 to a data structure (not explicitly shown in either FIG. 1 or FIG. 2) that may be located in the system memory 104, the PP memory 204, or another storage location accessible to both the CPU 102 and the PPU 202. A pointer to the data structure is written to a command queue, also referred to herein as a pushbuffer, to initiate processing of the stream of commands in the data structure. In one or more embodiments, the PPU 202 reads command streams from the command queue and then executes commands asynchronously relative to the operation of the CPU 102. In embodiments where multiple pushbuffers are generated, execution priorities may be specified for each pushbuffer by an application program via device driver to control scheduling of the different pushbuffers.

In one or more embodiments, the PPU 202 includes an I/O unit 205 that communicates with the rest of the system 100 via the communication path 113 and the memory bridge 105. In one or more embodiments, the I/O unit 205 generates packets (or other signals) for transmission on the communication path 113 and also receives all incoming packets (or other signals) from the communication path 113, directing the incoming packets to appropriate components of the PPU 202. For example, commands related to processing tasks may be directed to a host interface 206, while commands related to memory operations (e.g., reading from or writing to the PP memory 204) may be directed to a crossbar unit 210. In one or more embodiments, the host interface 206 reads each command queue and transmits the command stream stored in the command queue to a front end 212.

As mentioned above in conjunction with FIG. 1, the connection of the PPU 202 to the rest of the system 100 may be varied. In one or more embodiments, the parallel processing subsystem 112, which includes at least one PPU 202, is implemented as an add-in card that can be inserted into an expansion slot of the system 100. In other embodiments, the PPU 202 can be integrated on a single chip with a bus bridge, such as the memory bridge 105 or the I/O bridge 107.

Again, in still other embodiments, some or all of the elements of the PPU 202 may be included along with the CPU 102 in a single integrated circuit or SoC.

In one or more embodiments, the front end 212 transmits processing tasks received from the host interface 206 to a work distribution unit (not shown) within a task/work unit 207. In one or more embodiments, the work distribution unit receives pointers to processing tasks that are encoded as task metadata ("TMD") and stored in memory. The pointers to TMDs are included in a command stream that is stored as a command queue and received by the front end 212 from the host interface 206. Processing tasks that may be encoded as TMDs include indices associated with the data to be processed as well as state parameters and commands that define how the data is to be processed. For example, the state parameters and commands could define the program to be executed on the data. The task/work unit 207 receives tasks from the front end 212 and ensures that general processing clusters ("GPCs") 208 are configured to a valid state before the processing task specified by each one of the TMDs is initiated. A priority may be specified for each TMD that is used to schedule the execution of the processing task. Processing tasks also may be received from the processing cluster array 230. Optionally, the TMD may include a parameter that controls whether the TMD is added to the head or the tail of a list of processing tasks (or to a list of pointers to the processing tasks), thereby providing another level of control over execution priority.

In one or more embodiments, the PPU 202 implements a highly parallel processing architecture based on a processing cluster array 230 that includes, without limitation, a set of C GPCs 208, where C≥1. Each GPC 208 is capable of executing a large number (e.g., hundreds or thousands) of threads concurrently, where each thread is an instance of a program. In various applications, different GPCs 208 may be allocated for processing different types of programs or for performing different types of computations. The allocation of the GPCs 208 may vary depending on the workload arising for each type of program or computation.

In one or more embodiments, a memory interface 214 includes, without limitation, a set of D partition units 215, where D≥1. Each partition unit 215 is coupled to one or more dynamic random-access memories ("DRAMs") 220 residing within the PP memory 204. In one or more embodiments, the number of partition units 215 equals the number of DRAMs 220, and each partition unit 215 is coupled to a different DRAM 220. In other embodiments, the number of partition units 215 may be different than the number of DRAMs 220. Persons of ordinary skill in the art will appreciate that a DRAM 220 may be replaced with any other technically suitable storage device. In operation, various render targets, such as texture maps and frame buffers, may be stored across DRAMs 220, allowing partition units 215 to write portions of each render target in parallel to efficiently use the available bandwidth of the PP memory 204.

In one or more embodiments, a given GPC 208 may process data to be written to any of the DRAMs 220 within the PP memory 204. In one or more embodiments, the crossbar unit 210 is configured to route the output of each GPC 208 to the input of any partition unit 215 or to any other GPC 208 for further processing. The GPCs 208 communicate with the memory interface 214 via the crossbar unit 210 to read from or write to various DRAMs 220. In one or more embodiments, the crossbar unit 210 has a connection to the I/O unit 205, in addition to a connection to the PP memory 204 via the memory interface 214, thereby enabling the processing cores within the different GPCs 208 to communicate with the system memory 104 or other memory not local to the PPU 202. In the embodiment of FIG. 2, the crossbar unit 210 is directly connected with the I/O unit 205. In one or more embodiments, the crossbar unit 210 may use virtual channels to separate traffic streams between the GPCs 208 and the partition units 215.

In one or more embodiments, the GPCs 208 can be programmed to execute processing tasks relating to a wide variety of applications, including, without limitation, linear and nonlinear data transforms, filtering of video and/or audio data, modeling operations (e.g., applying laws of physics to determine position, velocity and other attributes of objects), image rendering operations (e.g., tessellation shader, vertex shader, geometry shader, and/or pixel/fragment shader programs), general compute operations, etc. In operation, the PPU 202 is configured to transfer data from the system memory 104 and/or the PP memory 204 to one or more on-chip memory units, process the data, and write result data back to the system memory 104 and/or the PP memory 204. The result data may then be accessed by other system components, including the CPU 102, another the PPU 202 within the parallel processing subsystem 112, or another parallel processing subsystem 112 within the system 100.

In one or more embodiments, any number of PPUs 202 may be included in each parallel processing subsystem 112. For example, multiple PPUs 202 may be provided on a single add-in card, or multiple add-in cards may be connected to the communication path 113, or one or more of the PPUs 202 may be integrated into a bridge chip. The PPUs 202 in a multi-PPU system may be identical to or different from one another. For example, different PPUs 202 might have different numbers of processing cores and/or different amounts of the PP memory 204. In implementations where multiple PPUs 202 are present, those PPUs may be operated in parallel to process data at a higher throughput than is possible with a single PPU 202. Systems incorporating one or more PPUs 202 may be implemented in a variety of configurations and form factors, including, without limitation, desktops, laptops, handheld personal computers or other handheld devices, servers, workstations, game consoles, embedded systems, and the like.

Figure 3:
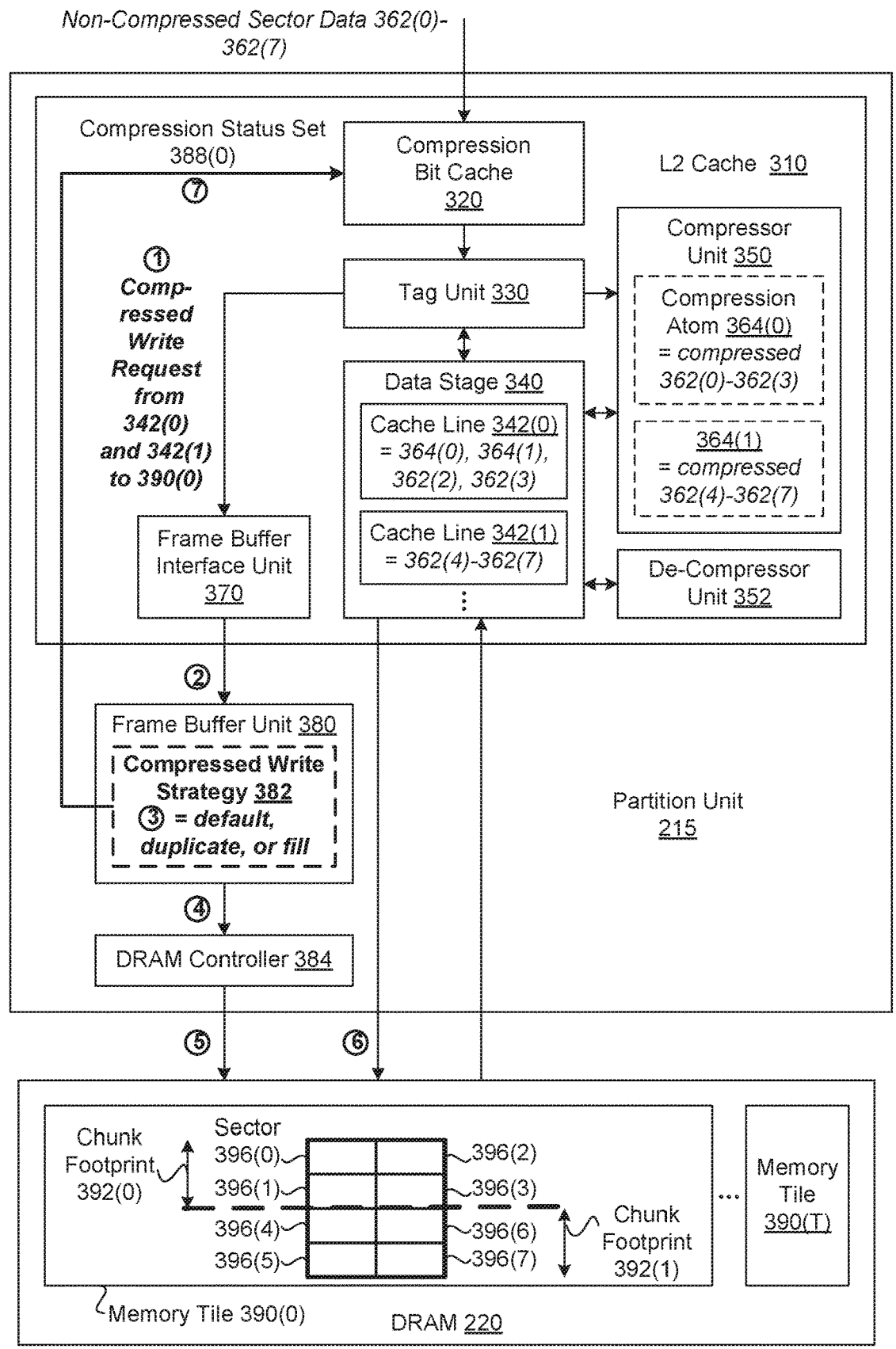
FIG. 3 is a more detailed illustration of one of the partition units of FIG. 2, according to various embodiments.

FIG. 3 is a more detailed illustration of one of the partition units 215 of FIG. 2, according to various embodiments. The partition unit 215 is also referred to herein as a "memory interface unit." As shown, the partition unit 215 includes, without limitation, a level two ("L2") cache 310, a frame buffer unit 380, and a DRAM controller 384. In one or more alternate embodiments, the partition unit 215 also includes a raster operations unit ("ROP"). The ROP performs raster operations, such as stencil, z test, blending, and the like, and transmits pixel data as processed graphics data for storage in graphics memory via the memory interface 214, where graphics memory is typically structured as one or more render targets.

The L2 cache 310 is a write-back cache that is configured to execute memory access requests received from a ROP (not shown) and the crossbar unit 210 (not shown in FIG. 3). The memory access requests are requests to write data to or read data from memory tiles 390 included in the DRAM 220. In alternate embodiments, the L2 cache 310 may receive memory access requests from any number of ROPs located in any number of partition units 215, in the memory interface 214, in the GPCs 208, in the processing cluster array 230 outside of the GPCs 208, or in a separate unit within the PPUs 202.

As shown, the L2 cache 310 includes, without limitation, a compression bit cache ("CBC") 320, a tag unit 330, a data stage 340, a compressor unit 350, a de-compressor unit 352, and a frame buffer interface unit 370. Upon receiving a memory access request, the CBC 320 and the tag unit 330 determine a compression status set 388 for the associated memory tile 390. The CBC 320 stores, without limitation, a different compression status set 388 for each memory tile 390 included in the DRAM 220. As described in greater detail subsequently herein, the compression status set 388 indicates, for each sector 396 of the associated memory tile 390, what type of data (e.g., compressed, non-compressed, garbage) is stored in the sector 396.

The tag unit 330 performs address computations based on the memory access request to determine whether the associated data is stored in the data stage 340. The tag unit 330 then processes the memory access request based on the type of memory access request, the associated compression status set 388, and whether the associated data is stored in the data stage 340. If the memory access request is a request to read the associated data, then the tag unit 330 determines whether the associated data is currently residing within any number of cache lines 342 that are included in the data stage 340. If so, meaning that there is a "cache hit," then the tag unit 330 interfaces with the data stage 340 to retrieve the associated data locally—without interfacing with the DRAM 220. If, however, the memory access request is a request to write the associated data, then the tag unit 330 determines whether the associated data can be written over data currently residing within one of the cache lines 342. If so, again meaning that there is a cache hit, then the tag unit 330 causes the associated data to be written to the appropriate location of the cache lines 342.

In the case of a "cache miss," meaning that the associated data is not resident in (in the case of a read request) or cannot be written to (in the case of a write request) one of the cache lines 342, then the tag unit 330 interfaces with the frame buffer unit 380 via the frame buffer interface unit 370 to execute the memory access request. The frame buffer unit 380 determines how and when the DRAM controller 384 executes the memory access request. The frame buffer unit 380 may execute any number of algorithms, heuristics, etc., as part of configuring the DRAM controller 384 to execute the memory access request. The DRAM controller 384 controls the transfer of data from the memory tiles 390 included in the DRAM 220 to the cache lines 342 included in the data stage 340 and, conversely, the transfer of data from the cache lines 342 to the memory tiles 390.

To increase effective memory bandwidth to the DRAM 220, thereby improving overall performance, the L2 cache 310 stores certain data within the DRAM 220 and the cache lines 342 in one or more compressed formats that reduce the number of bytes used to represent the original data. In one or more embodiments, any number of the cache lines 342 stores a non-compressed chunk of data across four sectors 396 of equal size. The number of bytes in a non-compressed chunk of data and therefore the size of each cache line 342 is equal to the number of bytes that the L2 cache 310 transmits to or from the DRAM 220 as part of performing a write or read operation, respectively.

To compress data, the tag unit 330 configures the compressor unit 350 to compress two non-compressed chunks of data stored in two cache lines 342 to generate two compression atoms 364. Each compression atom 364 stores a compressed chunk of data. For explanatory purposes only, the compressor unit 350 implements a four-to-one compression format and, consequently, each compression atom 364 can be stored in a single sector 396. The compressor unit 350 stores the resulting compression atoms 364(0) and 364(1) in the sectors 396(0) and 396(1), respectively, of one of the cache lines 342. Storing the resulting compression atoms 364 in a single cache line 342 not only compresses the data stored in the L2 cache 310 but can also improve the effective memory bandwidth between the L2 cache 310 and the DRAM 220 when the two compression atoms 364 are transferred in a single write operation or a single read operation.

For explanatory purposes only, FIG. 3 depicts the state of the cache lines 342(0) and 342(1) after the compressor unit 350 compresses non-compressed sector data 362(0)-362(3) stored in the cache line 342(0) and the non-compressed sector data 362(4)-362(7) stored in the cache line 342(1). Each of the non-compressed sector data 362(0)-362(3) is a quarter of one non-compressed chunk of data, and each of the non-compressed sector data 362(4)-362(7) is a quarter of another non-compressed chunk of data.

As depicted in italics, the compressor unit 350 compresses the non-compressed sector data 362(0)-362(3) to generate the compression atom 364(0) and compresses the non-compressed sector data 362(4)-362(7) to generate the compression atom 364(1). The compressor unit 350 stores the compression atoms 364(0) and 364(1) in the sectors 396(0) and 396(1), respectively, of the cache line 342(0), thereby overwriting the non-compressed sector data 362(0) and 362(1) previously stored in the cache line 342(0). As depicted in italics, after compression, the cache line 342(0) stores the compression atoms 364(0) and 364(1) and the non-compressed sector data 362(2) and 362(3). By contrast, the cache line 342(1) still stores the non-compressed sector data 362(4)-362(7).

Although not explicitly depicted in FIG. 3, the de-compressor unit 352 may operate on any number of the compression atom(s) 364 stored in any number of the cache lines 342 to recreate the original non-compressed chunk(s) of data. The tag unit 330 may configure the de-compressor unit 352 to overwrite any of the cache lines 342 or write the original non-compressed chunk(s) of data to different cache lines 342. For instance, the de-compressor unit 352 could operate on the compression atom 364(1) stored in the cache line 342(0) to recreate the non-compressed sector data 362(0)-362(3) and then store the non-compressed sector data 362(0)-362(3) in the cache line 342(0).

The L2 cache 310 may configure the DRAM controller 384 to transfer any number of compression atoms 364 and any amount of non-compressed data in any combination from the cache lines 342 to the memory tiles 390 and, conversely, from the memory tiles 390 to the cache lines 342. Consequently, at any given time, the DRAM 220 and the data stage 340 may each include compressed data, non-compressed data, or a combination of compressed data and non-compressed data.

As shown, the DRAM 220 includes, without limitation, any number of memory tiles 390, where each of the memory tiles 390 is associated with a different contiguous range of memory addresses. In one or more embodiments, each of the memory tiles 390 stores two chunks of data for the associated range of memory addresses across the eight sectors 396(0)-396(7). When non-compressed data for the lower half of the associated range of memory addresses is stored in the memory tile 390, the non-compressed data is stored within a chunk footprint 392(0) that includes, without limitation, the sectors 396(0)-396(3). When non-compressed data for the upper half of the associated range of memory addresses is stored in the memory tile 390, the non-compressed data is stored within the chunk footprint 392(1) that includes, without limitation, the sectors 396(4)-396(7). The chunk footprints 392 are also referred to herein as two "halves" of the associated memory tile 390.

Each compression atom 364 is stored in the memory tile 390 that is associated with the memory address of the non-compressed chunk of data from which the compression atom 364 was derived. In various embodiments, in order to improve the effective memory bandwidth between the L2 cache 310 and the DRAM 220, the two compression atoms 364 associated with a given memory tile 390 are stored together in a single chunk footprint 392.

As described previously herein, in a conventional processing system, when a non-compressed chunk of data is written to a compressed memory tile, a read-modify-write ("RMW") operation that includes a read operation in addition to one or more write operation(s) is performed. The RMW operation ensures that compressed data stored in the memory tile is not overwritten with unrelated non-compressed data. By contrast, when a non-compressed chunk of data is written to a non-compressed memory tile, a single write operation is performed. For applications in which non-compressed data is often written to compressed memory tiles, executing the associated RMW operations can reduce or even eliminate any improvement in effective memory bandwidth and performance gains associated with transmitting compressed data.

Opportunistically Writing to Additional Sectors During Compressed Writes

To reduce the number of RMW operations that the L2 cache 310 performs when writing non-compressed data to memory tiles 390 that also include compressed data, the partition unit 215 opportunistically stores additional data in any number of the memory tiles 390. Strong the additional data in a given memory tile 390 enables the L2 cache 310 to write non-compressed data to one or more portions of the memory tile 390 without losing the data that is stored for the remaining portions of the memory tile 390. As a result, at any given time, the memory tile 390 may store a mixture of compression atoms 364 and non-compressed sector data 362. For this reason, the compression status set 388 of a given memory tile 390 indicates the individual compression status of each sector 396 in the memory tile 390 in any technically feasible fashion via any number of bits. The compression status set 388 may indicate the eight individual sector statuses for the associated memory tile 390 in any technically feasible fashion via any number of bits. For instance, in one or more embodiments, the compression status set 388 indicates, for each sector 396 of the associated memory tile 390, whether the sector 396 stores non-compressed sector data 362, one of the compression atoms 364, or garbage data (e.g., no data has been written to the sector 396).

For explanatory purposes only, a series of bubbles numbered 1-7 depict an example of how the partition unit 215 opportunistically stores additional data in the memory tile 390(0). As depicted with the bubble numbered 1, the tag unit 330 transmits a compressed write request to the frame buffer interface unit 370. The compressed write request specifies that the cache line 342(0) stores the compression atoms 364(0) and 364(1) that are to be written to the memory tile 390(0) as well as the non-compressed sector data 362(2) and 362(3). The compressed write request also specifies that the cache line 342(1) stores an associated non-compressed chunk of data. As shown, together the cache lines 342(0) and 342(1) store the compression atoms 364(0) and 364(1) as well as the non-compressed sector data 362(2)-362(7) that were not overwritten with the compression atoms 364(0) and 364(1).

As depicted with the bubble numbered 2, the frame buffer interface unit 370 transmits the compressed memory write request to the frame buffer unit 380. As depicted with the bubble numbered 3, the frame buffer unit 380 selects a compressed write strategy 382 for the memory tile 390(0). In one or more embodiments, the compressed write strategy 382 is one of "default," "duplicate," or "fill." Each of the compressed write strategies 382 involves storing data in a different number of the sectors 396 of the memory tile 390(0).

Irrespective of the compressed write strategy 382, the frame buffer unit 380 configures the DRAM controller 384 to copy the compression atoms 364(0) and 364(1) from the cache line 342(0) to the sectors 396(0) and 396(1), respectively, of the memory tile 390(0). For the compressed write strategy 382 of default, the frame buffer unit 380 does not configure the DRAM controller 384 to copy data to the sectors 396(2)-396(7) of the memory tile 390(0).

For the "duplicate" compressed write strategy 382, the frame buffer unit 380 also configures the DRAM controller 384 to copy the compression atom 364(1) from the cache line 342(0) to the sector 396(4) of the memory tile 390(0). As a result, each of the chunk footprints 392 included in the memory tile 390(0) stores, without limitation, a copy of the compression atom 364 that includes the compressed data for the constituent sectors 396.

For the "fill" compressed write strategy 382, the frame buffer unit 380 also configures the DRAM controller 384 to copy the non-compressed sector data 362(2)-362(3) from the cache line 342(0) to the sectors 396(2) and 396(3), respectively, of the memory tile 390(0). Similarly, the frame buffer unit 380 configures the DRAM controller 384 to copy the non-compressed sector data 362(4)-362(7) from the cache line 342(1) to the sectors 396(4)-396(7), respectively, of the memory tile 390(0).

In one or more alternate embodiments, in addition to copying the compression atoms 364(0) and 364(1) to two sectors 396 of the memory tile 390(0), the frame buffer unit 380 may configure the DRAM controller 384 to copy any amount of the data stored in the cache lines 342(0) and 342(1) to any number of the remaining sectors 396 of the memory tile 390(0).

The frame buffer unit 380 may select the compressed write strategy 382 in any technically feasible fashion. For instance, in some embodiments, the frame buffer unit selects the compressed write strategy 382 based on a status associated with the DRAM 220. The frame buffer unit 380 may track and/or compute any status associated with the DRAM 220 in any technically feasible fashion. For instance, in some embodiments, the frame buffer unit 380 determines the status associated with the DRAM 220 based on the number and type of memory access requests the DRAM 220 is scheduled to execute and/or the memory bandwidth utilization between the L2 cache 310 and the DRAM 220.

In one or more embodiments, the frame buffer unit 380 selects the compressed write strategy 382 to opportunistically utilize any unused available memory bandwidth between the L2 cache 310 and the DRAM 220. As persons skilled in the art will recognize, the amount of data that is transferred between the L2 cache 310 and DRAM 220 is different for different compressed write strategies 382. Of the three compressed write strategies 382 described herein, "default" involves transferring the smallest amount of data, "fill" involves transferring the largest amount of data, and "duplicate" involves transferring an intermediate amount of data. If the memory bandwidth utilization is above an upper threshold, then the frame buffer unit 380 selects the compressed write strategy 382 of default. Otherwise, if the memory bandwidth utilization below a lower threshold, then the frame buffer unit 380 selects the compressed write strategy 382 of fill. Otherwise, the frame buffer unit 380 selects the compressed write strategy 382 of duplicate.

In one or more embodiments, the frame buffer unit 380 selects the compressed write strategy 382 based on any number of heuristics. For example, the frame buffer unit 380 could maintain a count of the number of times that the frame buffer unit 380 executes a write operation to one of the memory tiles 390 that includes compressed data, without performing an intervening read operation to the memory tile 390. If the count is greater than an empirically determined threshold, then the frame buffer unit 380 could select the compressed write strategy 382 of fill. In one or more other embodiments, the frame buffer unit 380 selects the compressed write strategy 382 based on the average size of the data associated with previous write operations. If the average size of the data is relatively low, then the frame buffer unit 380 could select the strategy 382 of fill.

As depicted with the bubble numbered 4, the frame buffer unit 380 configures the DRAM controller 384 to write data to the memory tile 390(0) as per the selected compressed write strategy 382. As depicted with the bubble numbered 5, as part of executing the selected compressed write strategy 382, the DRAM controller 384 copies data from the data stage 340 to the memory tile 390(0).

After the DRAM controller 384 finishes the compressed write to the memory tile 390(0), the frame buffer unit 380 generates the compression status set 388(0) that indicates the type of data that is stored in each of the sectors 396 of the memory tile 390(0). As depicted with the bubble numbered 7, the frame buffer unit 380 transmits the compression status set 388(0) to the CBC 320. The CBC 320 may store the compression status set 388(0) and/or any amount of data derived from the compression status set 388(0) in any technically feasible fashion and in any technically feasible format.

Subsequently, if the L2 cache 310 receives a request to write non-compressed data to the memory tile 390(0), then the tag unit 330 determines whether to implement the request via a write operation or an RMW operation based on the compression status set 388(0). As part of executing any write operation, including a constituent write operation of an RMW operation, if the type of data stored in any of the sectors 396 of the memory tile 390(0) changes, then the frame buffer unit 380 updates the compression status set 388(0) accordingly.

Figure 4:
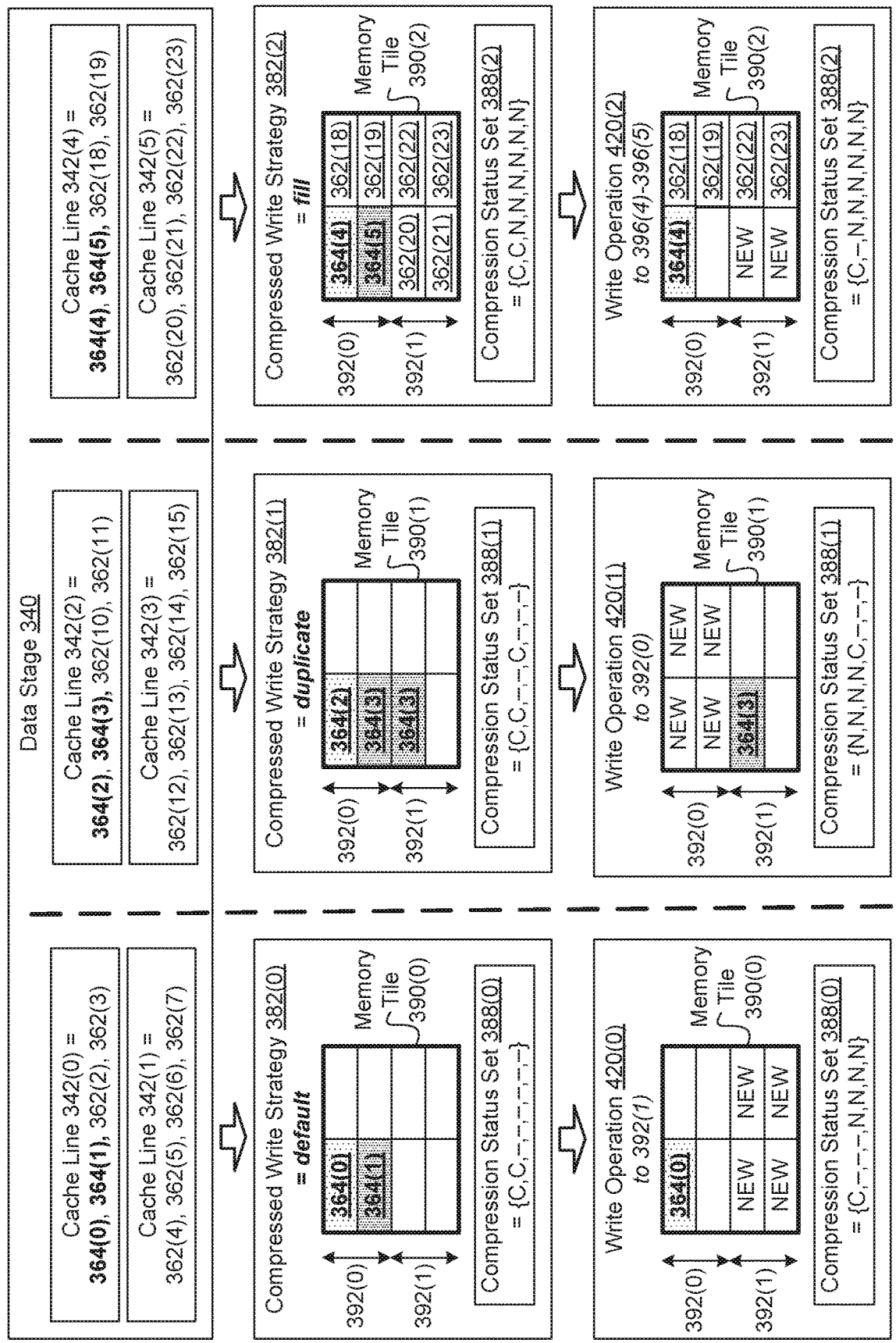
FIG. 4 illustrates examples of how the compressed write strategies of FIG. 3 can reduce read-modify-write operations, according to various embodiments.

Notably and as described in greater detail in conjunction with FIG. 4, the compressed write strategy 382 of default enables the partition unit 215 to implement a subsequent write request of a non-compressed chunk of data to the chunk footprint 392(1) as a write operation. The compressed write strategies 382 of duplicate and fill both enable the partition unit 215 to implement a subsequent write request of a non-compressed chunk of data to either of the chunk footprints 392 as a write operation. The compressed write strategy 382 of fill additionally enables the partition unit 215 to implement a subsequent write request of non-compressed data to any one or contiguous sequence of the sectors 396(2)-396(7) as a write operation.

It will be appreciated that the partition unit 215 shown herein is illustrative and that variations and modifications are possible. For example, the functionality provided by the L2 cache 310, the CBC 320, the tag unit 330, the data stage 340, the compressor unit 350, the de-compressor unit 352, the frame buffer interface unit 370, the frame buffer unit 380, and the DRAM controller 384 as described herein may be integrated into or distributed across any number of hardware components and/or software code. Further, the connection topology between the various units in FIG. 3 may be modified as desired.

Note that the techniques described herein are illustrative rather than restrictive and may be altered without departing from the broader spirit and scope of the invention. Many modifications and variations on the functionality provided by the L2 cache 310, the CBC 320, the tag unit 330, the data stage 340, the compressor unit 350, the de-compressor unit 352, the frame buffer interface unit 370, the frame buffer unit 380, and the DRAM controller 384 will be apparent to those of ordinary skill in the art without departing from the scope and spirit of the described embodiments.

For instance, in one or more alternate embodiments, the techniques outlined herein may be applied to any processing subsystem, any type of cache, any size(s) and type(s) of memory, any compression algorithms, any compression formats, and any type of memory access requests. Furthermore, the memory may be organized in any technically feasible fashion. For instance, in some embodiments, each memory tile 390 may include four chunk footprints 392 instead of two chunk footprints 392. In the same or other embodiments, the chunk footprints 392 of a given memory tile 390 may not be associated with contiguous ranges of memory addresses.

Reducing RMW Operations Based on Compression Status Sets

FIG. 4 illustrates examples of how the compressed write strategies 382 of FIG. 3 can reduce RMW operations, according to various embodiments. For explanatory purposes only and as shown, the data stage 340 includes, without limitation the cache lines 342(0)-342(6). Each compression status set 388 is denoted as a parenthetical list of eight entries specifying, in order, the individual status of the sectors 396(0)-396(7) of the associated memory tile 390. Each individual status is denoted as a 'C,' 'U,' or '-' to indicate that the associated sector 396 stores compressed data, non-compressed data, or garbage data, respectively.

Together, the cache lines 342(0) and 342(1) include, without limitation, the compression atoms 364(0) and 364(1) and the non-compressed sector data 362(2)-362(7). After the partition unit 215 writes data from the cache line 342(0) to the memory tile 390(0) as per the compressed write strategy 382(0) of default, the sectors 396(0) and 396(1) of the memory tile 390(0) store the compression atoms 364(0) and 364(1), respectively, The sectors 396(2)-396(7) of the memory tile 390(0) store garbage data. The compression status set 388(0) is therefore {C, C, -, -, -, -, -, -}.

As shown, the partition unit 215 subsequently receives a request to write a non-compressed chunk of data to the chunk footprint 392(1) of the memory tile 390(0). Because the compression status set 388(0) indicates that the sectors 396(4)-396(7) included in the chunk footprint 392(1) store garbage data, the partition unit 215 executes a write operation 420(0) that stores the non-compressed chunk of data across the sectors 396(4)-396(7). The sectors 396 that store new data as a result of the write operation 420(0) are annotated with "NEW." Because the sectors 396(4)-496(7) now store non-compressed data, and the compression atom 364(1) stored in the sector 396(1) is no longer valid, the frame buffer unit 380 updates the compression status set 388(0) to {C, -, -, -, N, N, N, N}.

Together, the cache lines 342(2) and 342(3) include, without limitation, the compression atoms 364(2) and 364(3) and the non-compressed sector data 362(10)-362(15). After the partition unit 215 writes data from the cache lines 342(2) and 342(3) to the memory tile 390(1) as per the compressed write strategy 382(1) of duplicate, the sectors 396(0), 396(1), and 396(4) of the memory tile 390(1) store the compression atoms 364(2), 364(3) and 364(3), respectively, The remaining sectors 396 store garbage data. The compression status set 388(1) is therefore {C, C, -, -, C, -, -, -}.

Subsequently, the partition unit 215 receives a request to write a non-compressed chunk of data to the chunk footprint 392(0) of the memory tile 390(1). The compression status set 388(1) indicates that the sector 396(4) stores compressed data and therefore the compressed data stored in the sector 396(1) can be overwritten without losing any useful data. Consequently, the partition unit 215 executes a write operation 420(1) that stores the non-compressed chunk of data across the sectors 396(0)-396(3) of the memory tile 390(1). The sectors 396 that store new data as a result of the write operation 420(1) are annotated with "NEW." Because the sectors 396(0)-396(3) now store non-compressed data, the frame buffer unit 380 updates the compression status set 388(1) to {N, N, N, N, C, -, -, -}.

Together, the cache lines 342(4) and 342(5) store, without limitation, the compression atoms 364(4) and 364(5) and the non-compressed sector data 362(18)-362(23). After the partition unit 215 writes data from the cache lines 342(4) and 342(5) to the memory tile 390(2) as per the compressed write strategy 382(2) of fill, the sectors 396(0) and 396(1) of the memory tile 390(0) store the compression atoms 364(4) and 364(5), respectively, The sector 396(2)-396(7) store the non-compressed sector data 362(18)-362(23), respectively. The compression status set 388(2) is therefore {C, C, N, N, N, N, N, N}.

Subsequently, the partition unit 215 receives a request to write new non-compressed data to the sectors 396(4) and 396(5). The compression status set 388(3) indicates that both the sectors 396(4) and 396(5) store non-compressed data and therefore the sectors 396(4) and 396(5) can be overwritten without losing any useful data. Consequently, the partition unit 215 executes a write operation 420(2) that stores the new non-compressed data across the sectors 396(4)-396(5) of the memory tile 390(2). The sectors 396(4) and 396(5) are therefore annotated with "NEW." Because the compression atom 364(5) stored in the sector 396(1) is no longer valid, the frame buffer unit 380 updates the compression status set 388(2) to {C, -, N, N, N, N, N, N}.

Figure 5:
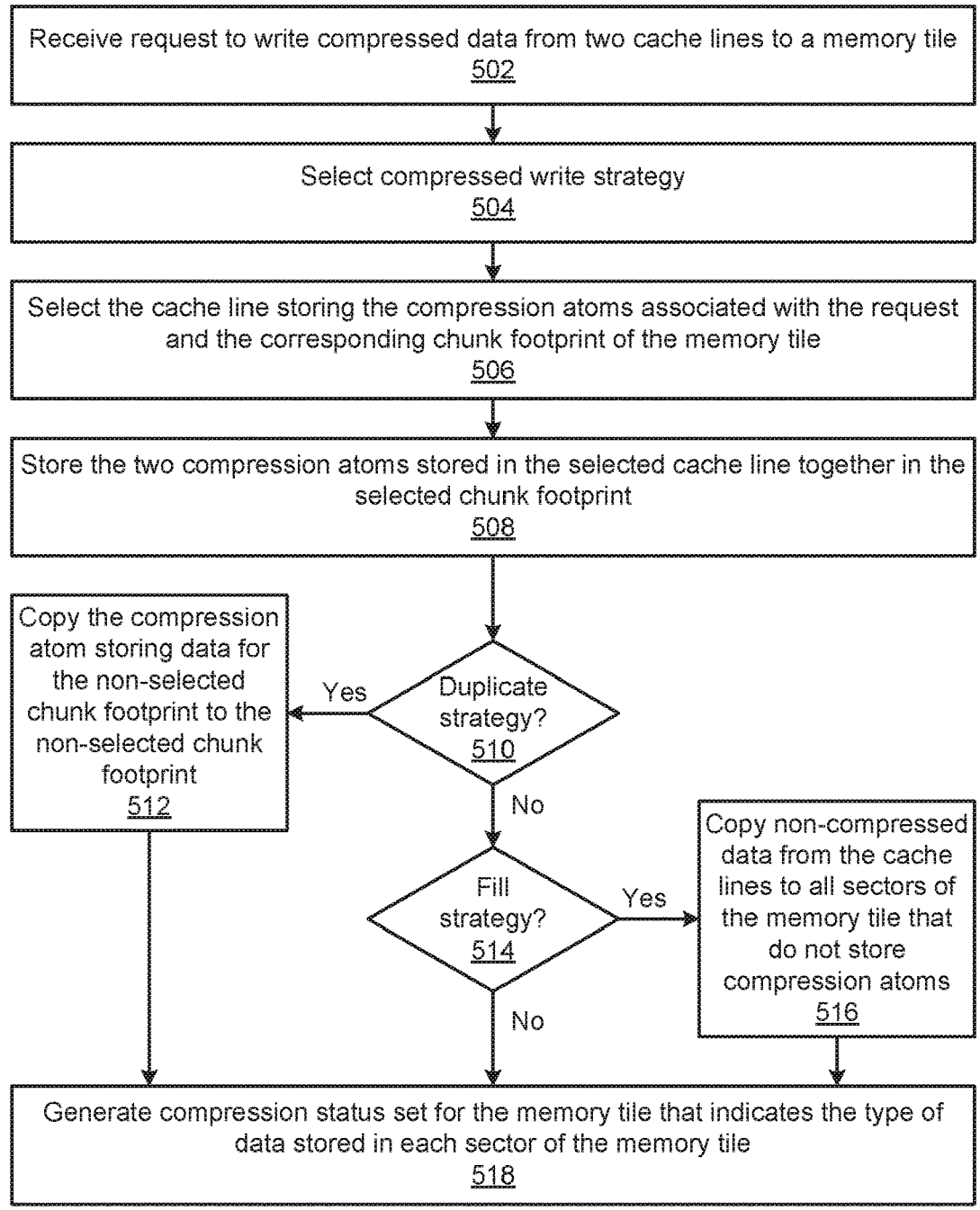
FIG. 5 is a flow diagram of method steps for writing compressed data to a memory, according to various embodiments.

FIG. 5 is a flow diagram of method steps for writing compressed data to a memory, according to various embodiments. Although the method steps are described with reference to the systems of FIGS. 1-4, persons skilled in the art will understand that any system configured to implement the method steps, in any order, falls within the scope of the present invention.

As shown, a method 500 begins a step 502, where the frame buffer unit 380 receives a request to write compressed data from two of the cache lines 342 to one of the memory tiles 390. At step 504, the frame buffer unit 380 selects the compressed write strategy 382 for the memory tile 390. At step 506, the frame buffer unit 380 selects the cache line 342 storing the compression atoms 364 associated with the request and the corresponding chunk footprint 392 of the memory tile 390. At step 508, the frame buffer unit 380 causes the DRAM controller 384 to store the two compression atoms 364 stored in the selected cache line 342 together in the selected chunk footprint 392.

At step 510, the frame buffer unit 380 determines whether the compressed write strategy 382 of duplicate is selected. If, at step 510, the frame buffer unit 380 determines that the compressed write strategy 382 of duplicate is selected, then the method 500 proceeds to step 512. At step 512, the frame buffer unit 380 causes the DRAM controller 384 to copy the compression atom 364 storing data for the non-selected chunk footprint 392 from the selected cache line 342 to the non-selected chunk footprint 392. The method 500 then proceeds directly to step 518.

If, however, at step 510, the frame buffer unit 380 determines that the compressed write strategy 382 of duplicate is not selected, then the method 500 proceeds directly to step 514. At step 514, the frame buffer unit 380 determines whether the compressed write strategy 382 of fill is selected. If, at step 514, the frame buffer unit 380 determines that the compressed write strategy 382 of fill is not selected, then the method 500 proceeds to step 518.

If, however, at step 514, the frame buffer unit 380 determines that the compressed write strategy 382 of fill is selected, then the method 500 proceeds to step 516. At step 516, the frame buffer unit 380 causes the DRAM controller 384 to copy the non-compressed data from the associated cache lines 342 to all the sectors 396 of the memory tile 390 that do not store the compression atoms 364. The method 500 then proceeds to step 518.

At step 518, the frame buffer unit 380 generates the compression status set 388 for the memory tile 390 that indicates the type of data stored in each sector 396 of the memory tile 390. The method 500 then terminates.

In sum, the disclosed techniques enable a system to efficiently write non-compressed data to a memory that also stores compressed data. In some embodiments, a partition unit includes, without limitation, an L2 cache, a frame buffer interface unit, and a DRAM controller. The L2 cache includes, without limitation, a CBC, a tag unit, a data stage, a compressor unit, a de-compressor unit, and a frame buffer interface unit. The CBC includes, without limitation, any number of compression status sets, where each compression status set indicates what type of data (e.g., compressed, non-compressed, or garbage) is stored in the constituent sectors of a different memory tile included in a DRAM. Each memory tile includes, without limitation, eight sectors, where four sectors are included in one chunk footprint and four sectors are included in another chunk footprint.

In operation, the CBC receives a request to write a non-compressed chunk of data to one of the chunk footprints in a memory tile and another request to write a different non-compressed chunk of data to the other chunk footprint in the memory tile. The tag unit stores the non-compressed chunks of data in two cache lines included in the data stage. Before the tag unit evicts the cache lines to the DRAM, the tag unit compresses the non-compressed chunks of data in the two cache lines and stores the resulting compression atoms in the first two sectors of one of the cache lines. As a result, one of the cache lines stores two compression atoms as well as non-compressed data for two sectors, and the other cache line is unchanged. To evict the cache lines, the tag unit sends a compressed write request to the frame buffer unit via the frame buffer interface unit.

The frame buffer unit causes a DRAM controller to copy the two compression atoms stores in one of the cache lines to the first two sectors of the memory tile. Furthermore, if the memory bandwidth utilization does not exceed an upper threshold, then the frame buffer unit opportunistically causes the DRAM controller to copy data from either or both cache lines to one or more additional sectors of the memory tile. Storing this type of data in the additional sector(s) of the memory tile increases the ability of the tag unit to implement writes of non-compressed data to the memory tile as write operations instead of RMW operations.

After the DRAM controller finishes the compressed write operation, the frame buffer unit generates and transmits the compression status set for the memory tile to the CBC. For each sector of the memory tile, the compression status set indicates whether the sector stores a compression atom, the associated non-compressed data, or garbage data. Based on the compression status set of the memory tile, the tag unit can determine whether to implement a subsequent request to write non-compressed data to the memory tile as an RMW operation or, preferably, a write operation.

At least one technical advantage of the disclosed techniques relative to the prior art is that, with the disclosed techniques, the partition unit can reduce the number of RMW operations associated with writing non-compressed data to memory tiles that already store compressed data. In that regard, opportunistically copying redundant information to a memory tile during a compressed write operation often enables the partition unit to subsequently write non-compressed data to one portion of the memory tile without overwriting the data associated with the remainder of the memory tile. Consequently, unlike prior art techniques, the partition unit can often store a non-compressed chunk of data in a memory tile that includes compressed data via a single write operation—without first executing a read operation. Accordingly, relative to prior art techniques, the improvement in effective memory bandwidth and performance gains associated with transmitting compressed data are more fully realized. These technical advantages provide one or more technological advancements over prior art approaches.

1. In some embodiments, a computer-implemented method for storing data comprises compressing first non-compressed data associated with a first range of memory addresses to generate first compressed data, compressing second non-compressed data associated with a second range of memory addresses to generate second compressed data, storing the first compressed data and the second compressed data in a first portion of a memory tile that is associated with the first range of memory addresses, and storing at least one of the second compressed data or at least a portion of the second non-compressed data in a second portion of the memory tile that is associated with the second range of memory addresses.

2. The computer-implemented method of clause 1, further comprising storing at least a portion of the first non-compressed data in the first portion of the memory tile.

3. The computer-implemented method of clauses 1 or 2, wherein storing the at least one of the second compressed data or the at least the portion of the second non-compressed data comprises determining a memory bandwidth utilization associated with a memory that includes the memory tile, and if the memory bandwidth utilization is above a threshold, then storing the second compressed data in the second portion of the memory tile, or if the memory bandwidth utilization is not above the threshold, then storing the at least the portion of the second non-compressed data in the second portion of the memory tile.

4. The computer-implemented method of any of clauses 1-3, wherein the first portion of the memory tile comprises a plurality of sectors that includes a first sector and a second sector that is adjacent to the first sector, and wherein storing the first compressed data and the second compressed data comprises storing the first compressed data in the first sector and storing the second compressed data in the second sector.

5. The computer-implemented method of any of clauses 1-4, wherein the second portion of the memory tile comprises a plurality of sectors, and wherein storing the at least one of the second compressed data or the at least the portion of the second non-compressed data comprises storing the second non-compressed data across the plurality of sectors.

6. The computer-implemented method of any of clauses 1-5, wherein the first portion of the memory tile comprises a first plurality of sectors and the second portion of the memory tile comprises a second plurality of sectors, and further comprising updating a compression status set associated with the memory tile to indicate that compressed data is stored in two sectors included in the first plurality of sectors and one sector included in the second plurality of sectors.

7. The computer-implemented method of any of clauses 1-6, wherein the first portion of the memory tile comprises a first plurality of sectors and the second portion of the memory tile comprises a second plurality of sectors, and further comprising updating a compression status set associated with the memory tile to indicate that compressed data is stored in two sectors included in the first plurality of sectors and non-compressed data is stored in at least one sector included in the second plurality of sectors.

8. The computer-implemented method of any of clauses 1-7, further comprising receiving a request to write third non-compressed data associated with the first range of memory addresses to the memory tile, determining that the second portion of the memory tile already stores compressed data, and performing a write operation to store the third non-compressed data in the first portion of the memory tile.

9. The computer-implemented method of any of clauses 1-8, further comprising receiving a request to write third non-compressed data associated with the second range of memory addresses to the memory tile, and performing a write operation to store the third non-compressed data in the second portion of the memory tile.

10. The computer-implemented method of any of clauses 1-9, wherein the second portion of the memory tile comprises a plurality of sectors, and further comprising receiving a request to write third non-compressed data to at least one sector included in the plurality of sectors, determining that the at least one sector included in the plurality of sectors does not already store compressed data, and performing a write operation to store the third non-compressed data in the at least one sector included in the plurality of sectors.

11. In some embodiments, a system comprises a processor and a memory interface unit coupled to the processor that compresses first non-compressed data associated with a first range of memory addresses to generate first compressed data, compresses second non-compressed data associated with a second range of memory addresses to generate second compressed data, stores the first compressed data and the second compressed data in a first portion of a memory tile that is associated with the first range of memory addresses, and stores at least one of the second compressed data or at least a portion of the second non-compressed data in a second portion of the memory tile that is associated with the second range of memory addresses.

12. The system of clause 11, wherein the memory interface unit stores at least a portion of the first non-compressed data in the first portion of the memory tile.

13. The system of clauses 11 or 12, wherein the memory interface unit stores the at least one of the second compressed data or the at least the portion of the second non-compressed data by determining a memory bandwidth utilization associated with a memory that includes the memory tile, and if the memory bandwidth utilization is above a threshold, then storing the second compressed data in the second portion of the memory tile, or if the memory bandwidth utilization is not above the threshold, then storing the at least the portion of the second non-compressed data in the second portion of the memory tile.

14. The system of any of clauses 11-13, wherein the first portion of the memory tile comprises a first plurality of sectors and the second portion of the memory tile comprises a second plurality of sectors, and wherein the memory interface unit updates a compression status set associated with the memory tile to indicate that compressed data is stored in two sectors included in the first plurality of sectors and non-compressed data is stored in at least one sector included in the second plurality of sectors.

15. The system of any of clauses 11-14, wherein the memory interface unit receives a request to write third non-compressed data associated with the first range of memory addresses to the memory tile, determines that the second portion of the memory tile already stores compressed data, and performs a write operation to store the third non-compressed data in the first portion of the memory tile.

16. The system of any of clauses 11-15, wherein a first total number of bytes included in the first portion of the memory tile is equal to a second total number of bytes included in the first non-compressed data.

17. The system of any of clauses 11-16, wherein the memory interface unit stores the first compressed data and the second compressed data by copying the first compressed data and the second compressed data from a cache line included in the memory interface unit to the first portion of the memory tile.

18. The system of any of clauses 11-17, wherein the memory interface unit stores the at least one of the second compressed data or the at least the portion of the second non-compressed data by copying the at least the portion of the second non-compressed data from a cache line included in the memory interface unit to the second portion of the memory tile.

19. The system of any of clauses 11-18, wherein the memory tile is included in an attached memory.

20. In some embodiments, a computing device comprises an attached memory that includes a memory tile, and a processing subsystem that comprises a processor and a memory interface unit coupled to the processor that compresses first non-compressed data associated with a first range of memory addresses to generate first compressed data, compresses second non-compressed data associated with a second range of memory addresses to generate second compressed data, stores the first compressed data and the second compressed data in a first portion of the memory tile that is associated with the first range of memory addresses, and stores at least one of the second compressed data or at least a portion of the second non-compressed data in a second portion of the memory tile that is associated with the second range of memory addresses.

Any and all combinations of any of the claim elements recited in any of the claims and/or any elements described in this application, in any fashion, fall within the contemplated scope of the embodiments and protection.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "module," a "system," or a "computer." In addition, any hardware and/or software technique, process, function, component, engine, module, or system described in the present disclosure may be implemented as a circuit or set of circuits. Furthermore, aspects of the present disclosure may take the form of a computer program product embodied in one or more computer readable medium(s) having computer readable program codec embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory ("EPROM" or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine. The instructions, when executed via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable gate arrays.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, sector, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A computer-implemented method for storing data, the method comprising:
    compressing first non-compressed data associated with a first range of memory addresses to generate first compressed data;
    compressing second non-compressed data associated with a second range of memory addresses to generate second compressed data;
    storing the first compressed data and the second compressed data in a first portion of a memory tile that is associated with the first range of memory addresses; and
    storing at least one of the second compressed data or at least a portion of the second non-compressed data in a second portion of the memory tile that is associated with the second range of memory addresses.

2. The computer-implemented method of claim 1, further comprising storing at least a portion of the first non-compressed data in the first portion of the memory tile.

3. The computer-implemented method of claim 1, wherein storing the at least one of the second compressed data or the at least the portion of the second non-compressed data comprises:
    determining a memory bandwidth utilization associated with a memory that includes the memory tile; and
    if the memory bandwidth utilization is above a threshold, then storing the second compressed data in the second portion of the memory tile, or
    if the memory bandwidth utilization is not above the threshold, then storing the at least the portion of the second non-compressed data in the second portion of the memory tile.

4. The computer-implemented method of claim 1, wherein the first portion of the memory tile comprises a plurality of sectors that includes a first sector and a second sector that is adjacent to the first sector, and wherein storing the first compressed data and the second compressed data comprises storing the first compressed data in the first sector and storing the second compressed data in the second sector.

5. The computer-implemented method of claim 1, wherein the second portion of the memory tile comprises a plurality of sectors, and wherein storing the at least one of the second compressed data or the at least the portion of the second non-compressed data comprises storing the second non-compressed data across the plurality of sectors.

6. The computer-implemented method of claim 1, wherein the first portion of the memory tile comprises a first plurality of sectors and the second portion of the memory tile comprises a second plurality of sectors, and further comprising updating a compression status set associated with the memory tile to indicate that compressed data is stored in two sectors included in the first plurality of sectors and one sector included in the second plurality of sectors.

7. The computer-implemented method of claim 1, wherein the first portion of the memory tile comprises a first plurality of sectors and the second portion of the memory tile comprises a second plurality of sectors, and further comprising updating a compression status set associated with the memory tile to indicate that compressed data is stored in two sectors included in the first plurality of sectors and non-compressed data is stored in at least one sector included in the second plurality of sectors.

8. The computer-implemented method of claim 1, further comprising:
   receiving a request to write third non-compressed data associated with the first range of memory addresses to the memory tile;
   determining that the second portion of the memory tile already stores compressed data; and
   performing a write operation to store the third non-compressed data in the first portion of the memory tile.

9. The computer-implemented method of claim 1, further comprising:
   receiving a request to write third non-compressed data associated with the second range of memory addresses to the memory tile; and
   performing a write operation to store the third non-compressed data in the second portion of the memory tile.

10. The computer-implemented method of claim 1, wherein the second portion of the memory tile comprises a plurality of sectors, and further comprising:
    receiving a request to write third non-compressed data to at least one sector included in the plurality of sectors;
    determining that the at least one sector included in the plurality of sectors does not already store compressed data; and
    performing a write operation to store the third non-compressed data in the at least one sector included in the plurality of sectors.

11. A system comprising:
    a processor; and
    a memory interface unit coupled to the processor that:
       compresses first non-compressed data associated with a first range of memory addresses to generate first compressed data,
       compresses second non-compressed data associated with a second range of memory addresses to generate second compressed data,
       stores the first compressed data and the second compressed data in a first portion of a memory tile that is associated with the first range of memory addresses, and
       stores at least one of the second compressed data or at least a portion of the second non-compressed data in a second portion of the memory tile that is associated with the second range of memory addresses.

12. The system of claim 11, wherein the memory interface unit stores at least a portion of the first non-compressed data in the first portion of the memory tile.

13. The system of claim 11, wherein the memory interface unit stores the at least one of the second compressed data or the at least the portion of the second non-compressed data by:
    determining a memory bandwidth utilization associated with a memory that includes the memory tile; and
    if the memory bandwidth utilization is above a threshold, then storing the second compressed data in the second portion of the memory tile, or
    if the memory bandwidth utilization is not above the threshold, then storing the at least the portion of the second non-compressed data in the second portion of the memory tile.

14. The system of claim 11, wherein the first portion of the memory tile comprises a first plurality of sectors and the second portion of the memory tile comprises a second plurality of sectors, and wherein the memory interface unit updates a compression status set associated with the memory tile to indicate that compressed data is stored in two sectors included in the first plurality of sectors and non-compressed data is stored in at least one sector included in the second plurality of sectors.

15. The system of claim 11, wherein the memory interface unit:
    receives a request to write third non-compressed data associated with the first range of memory addresses to the memory tile;
    determines that the second portion of the memory tile already stores compressed data; and
    performs a write operation to store the third non-compressed data in the first portion of the memory tile.

16. The system of claim 11, wherein a first total number of bytes included in the first portion of the memory tile is equal to a second total number of bytes included in the first non-compressed data.

17. The system of claim 11, wherein the memory interface unit stores the first compressed data and the second compressed data by copying the first compressed data and the second compressed data from a cache line included in the memory interface unit to the first portion of the memory tile.

18. The system of claim 11, wherein the memory interface unit stores the at least one of the second compressed data or the at least the portion of the second non-compressed data by copying the at least the portion of the second non-compressed data from a cache line included in the memory interface unit to the second portion of the memory tile.

19. The system of claim 11, wherein the memory tile is included in an attached memory.

20. A computing device comprising:
    an attached memory that includes a memory tile; and
    a processing subsystem, comprising:
       a processor; and
       a memory interface unit coupled to the processor that:
          compresses first non-compressed data associated with a first range of memory addresses to generate first compressed data,
          compresses second non-compressed data associated with a second range of memory addresses to generate second compressed data,
          stores the first compressed data and the second compressed data in a first portion of the memory tile that is associated with the first range of memory addresses, and
          stores at least one of the second compressed data or at least a portion of the second non-compressed data in a second portion of the memory tile that is associated with the second range of memory addresses.

\* \* \* \* \*